(12) United States Patent
Swensen et al.

(10) Patent No.: US 7,136,016 B1
(45) Date of Patent: Nov. 14, 2006

(54) PLATFORM POSITION LOCATION AND CONTROL

(75) Inventors: Marvin D. Swensen, Fullerton, CA (US); John G. Himes, Placentia, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/130,007

(22) Filed: May 16, 2005

(51) Int. Cl.
*G01S 3/02* (2006.01)
(52) U.S. Cl. .................................... 342/455
(58) Field of Classification Search ............... 342/450, 342/453, 455; 701/117, 120
See application file for complete search history.

(56) References Cited

U.S. PATENT DOCUMENTS

| | | | | |
|---|---|---|---|---|
| 6,028,823 | A * | 2/2000 | Vincent et al. | 367/63 |
| 6,119,013 | A * | 9/2000 | Maloney et al. | 455/456.2 |
| 6,266,014 | B1 * | 7/2001 | Fattouche et al. | 342/450 |
| 2005/0148346 | A1 * | 7/2005 | Maloney et al. | 455/456.6 |
| 2005/0273258 | A1 * | 12/2005 | MacNeille et al. | 701/300 |

* cited by examiner

*Primary Examiner*—Dao L. Phan

(74) *Attorney, Agent, or Firm*—Gates & Cooper LLP

(57) ABSTRACT

A method and apparatus for determining and tracking the geodetic position of a mobile platform (i.e., aircraft). The apparatus comprises a ground controller assigned to a geographic space (i.e., an airspace) and at least one mobile platform (i.e., aircraft) communicating with the ground controller on a bi-directional communications link, wherein each mobile platform (i.e., aircraft) transmits a mobile platform (i.e., an aircraft) signal comprising at least a time of transmission of the mobile platform (i.e., aircraft) signal; the ground controller transmits a ground signal comprising at least a time of transmission of the ground signal and a location of the ground controller; each mobile platform (i.e., aircraft) performs time-of-arrival (TOA) measurements on the mobile platform (i.e., aircraft) signals received by that mobile platform (i.e., aircraft) and also performs TOA measurements on the ground signal received by that mobile platform (i.e., aircraft); the ground controller performs TOA measurements on each of the mobile platform (i.e., aircraft) signals received by the ground controller; each mobile platform (i.e., aircraft) determines a range (i.e., an air range) between that mobile platform (i.e., aircraft) and other mobile platforms (i.e., aircraft) and a ground range between that mobile platform (i.e., aircraft) and the ground controller; each mobile platform (i.e., aircraft) determines its geodetic position based on at least the ranges (i.e., air ranges) and ground range for that mobile platform (i.e., aircraft) and the position of the ground controller.

16 Claims, 5 Drawing Sheets

PLATFORM POSITION LOCATION AND CONTROL

BACKGROUND OF THE INVENTION

1. Field of the Invention

The present invention relates to wireless communications systems, and particularly to wireless communications systems using aircraft to determine aircraft position and for monitoring aircraft position.

2. Description of the Related Art

Locating mobile platforms is vital for many applications and consequently attracts much attention. Radio positioning or use of radio waves to locate mobile platforms includes both non-cooperative techniques (e.g., radar) and cooperative techniques wherein mobile platforms receive only, transmit only, or both receive and transmit (e.g., GPS, Teletrac, or EPLRS, respectively).

All of these techniques rely on radio wave propagation time between transmitter and receiver. Most systems based on these techniques employ reference sites with fixed, known geolocations as a basis for locating mobile platforms although some systems use mobile reference platforms with locations separately determined, e.g., state of the art literature describes a means for determining locations for satellite reference platforms used in a positioning system such as GPS.

In using GPS, each user (mobile platform) makes simultaneous or near-simultaneous time-of-arrival measurements on signals arriving from at least four different GPS satellites. These measurements resolve unknown user platform parameters ($p_x$, $p_y$, $p_z$ and t) because satellite ephemeris are approximately known and GPS satellites are synchronized (i.e., their relative clock offsets are known). However, specialized GPS receivers are necessary to perform GPS-related geodetic determinations.

In using Teletrac, each of four or more reference sites makes simultaneous time-of-arrival measurements on signals arriving from the mobile platform. Together, these measurements resolve unknown user platform parameters ($p_x$, $p_y$, $p_z$ and t) because reference site geodetic positions are known, and these sites are synchronized (i.e., their relative clock offsets are known). Some systems of this type use measurements, not necessarily time-of-arrival measurements, made at different times (e.g., Doppler frequency measurements on different orbital passes for SARSAT) to determine locations.

Position Location Reporting System (PLRS) relies on two-way time-of-arrival measurements to develop range measurements subsequently converted to position fixes based on three participating platforms with known locations (references) as well as barometric altitude for each mobile platforms. Mobile platforms with position fixes can serve as references for determining positions for other mobile platforms as they enter the system. All computation of position occurs at master stations, and mobile platforms know their positions only if master stations provide this information to these platforms.

Four reference platforms are sufficient to provide absolute position for asynchronous participants in position location systems (e.g., GPS): three to resolve position and one for participant timing (clock) offset. Reference platforms may be mobile (like GPS satellites) provided their positions (and offsets) are calculable by user platforms. Among position location systems using reference sites with known geolocations as a basis for locating mobile platforms, position determination for cellular phones has enjoyed great popularity recently due largely to government-mandated E911 requirements.

As already described, other systems use two-way ranging, between mobile platforms and reference platforms only, to locate mobile platforms. These systems reduce the minimum number of reference sites from four to three for three-dimensional position location or from three to two for two-dimensional position location, because paired two-way measurements (platform j to platform k and vice versa) eliminate timing offsets. Use of two-way ranging (or round trip delay measurements) has ancillary benefits such as eliminating the need for highly accurate clocks for mobile platforms.

Alternatively, use of additional measurements such as angle-of-arrival measurements can also reduce the number of fixed sites required to as few as two for a three-dimensional position location. Especially where ground-based reference sites support position location over vast areas, reducing the number of sites required is important in controlling infrastructure cost.

Available systems cannot reduce the number of reference sites below two regardless of the technique(s) employed without significant sacrifices in performance (whether position location quality or time to first fix), depending upon the approach taken and mobile platform parameters.

Further, presently available systems all rely on outside systems, such as GPS, to perform position determination. However, GPS systems and signals may not always be available due to weather, satellite degradation or failure, or other factors.

It can be seen, then, that there is a need in the art for an independent system for determination of geodetic position without the use of, and independent of, GPS or other external signals. It can also be seen that there is a need in the art for making position information for all mobile platforms available externally without recourse to an external communications system as required when using GPS for developing mobile platform locations.

SUMMARY OF THE INVENTION

A collection of mobile platforms which are capable of making only time-of-arrival measurements can determine their positions. This approach is a very simple implementation and does not require other common measurements: angle measurements, Doppler measurements, etc. Use of such measurements is common, e.g., aircraft location systems often experience degraded performance because they rely on angle measurements as well as range measurements to minimize the number of required ground sites.

The present invention comprises a method and apparatus for determining and tracking the geodetic position of a mobile platform, an aircraft being an example. An apparatus in accordance with the present invention comprises a ground controller assigned to a geographic space, such as an airspace, and at least one mobile platform, such as an aircraft, communicating with the ground controller on a bi-directional communications link, wherein each mobile platform, such as an aircraft, transmits a mobile platform (i.e., an aircraft) signal comprising at least a time of transmission of the mobile platform (i.e., aircraft) signal; the ground controller transmits a ground signal comprising at least a time of transmission of the ground signal and a location of the ground controller; each mobile platform (i.e. aircraft) performs time-of-arrival (TOA) measurements on the mobile platform (i.e., aircraft) signals received by that mobile platform (i.e, aircraft) and also performs TOA measurements on the ground signal received by that mobile platform (i.e, aircraft); the ground controller performs TOA measurements on each of the mobile platform (i.e., aircraft) signals received by the ground controller; each mobile platform (i.e., aircraft) determines a range (i.e, an air range) between that mobile platform/aircraft and other mobile platform/ aircraft, and a ground range between that mobile platform/ aircraft and the ground controller; each mobile platform/ aircraft determines its geodetic position based on at least the ranges/air ranges and ground range for that mobile platform/ aircraft and the position of the ground controller; and the ground controller monitors each of the mobile platform/ aircraft within the geographic space (i.e., airspace) to warn each of the mobile platform/aircraft about possible collisions between mobile platform/aircraft.

The system can also comprise at least one additional ground controller, each additional ground controller assigned to a separate geographic space (i.e., airspace), and at least one transition zone, wherein the transition zone comprises the overlap of at least two of the geographic spaces (i.e., airspaces). When the mobile platform (i.e., aircraft) is in the transition zone, the mobile platform (i.e, aircraft) sends and receives signals from more than one ground controller, and the ground controllers that are each receiving signals from the mobile platform (i.e., aircraft) in the transition zone can send additional signals between the ground controllers. The ground controllers can each transmit on a different frequency and can each assign transmission slots to each mobile platform (i.e., aircraft) operating in that ground controller's respective airspace in a Time Domain Multiple Access (TDMA) communications system.

The mobile platform (i.e., aircraft) signals may further comprise identification data for identifying the transmitting mobile platform (i.e., aircraft), and each aircraft can also transmit, as part of its mobile platform (i.e., aircraft) signals, range (i.e., air range) calculations performed by that mobile platform/aircraft.

A method in accordance with the present invention comprises sending a ground signal from a ground controller to at least one mobile platform/aircraft operating in a geographic space/an airspace, the ground signal comprising a time of transmission of the ground signal and a location of the ground controller; sending a signal (i.e., an air signal) from each mobile platform/aircraft operating in the geographic space/airspace, each signal (i.e., air signal) comprising a time of transmission of the respective air signal, wherein each mobile platform/aircraft determines a range/air range between that mobile platform/aircraft and other mobile platforms/aircraft, and a ground range between that mobile platform/aircraft and the ground controller, and each mobile platform/aircraft determines its geodetic position based on at least the ranges (i.e., air ranges and ground range) for that mobile platform/aircraft and the position of the ground controller.

The method may also include sending a second ground signal from a second ground controller to mobile platforms/ aircraft operating in a transition zone between the ground controller and the second ground controller, or sending additional signals between the ground controllers and the second ground controller. Further, the ground controllers can transmit on different frequencies or operate in a TDMA system. The mobile platform/aircraft signals can also comprise identification data for identifying the transmitting mobile platform (i.e., aircraft), and each mobile platform/aircraft can transmit, as part of its mobile platform/aircraft signals, range (i.e., air range) calculations performed by that mobile platform/aircraft.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

There are typically over 3000 commercial aircraft operating over the United States during normal daily operating hours. Within any given volume of airspace, there can be several (n) aircraft, each having a speed and direction. Each of these n aircraft, or mobile platforms, possesses a time history for its position p(t) and velocity v(t) vectors. A fixed site, typically located on the ground, is designated as a platform (platform 0) with a position vector and a velocity vector (of zero velocity when the platform is located on the ground) at all times. Each platform routinely and regularly performs time-of-arrival (TOA) measurements of the transmissions of every other platform in the given volume of airspace. The TOA measurements can resolve into ranges between the platforms involved.

The clock offsets between platforms can be resolved because the offsets between platforms cancel. So for measurements between platforms j and k, the clock offsets between platforms j and k cancel out, leaving each platform with the ability to calculate the range between the respective platforms.

Further, the use of a single ground station for a given airspace allows for fewer ground stations, as well as additional assistance in clock offset reduction. Since every platform can calibrate its clock offset with respect to the ground station clock, or synchronize its clock to the ground station clock in a given airspace, the clock offset problem can be eliminated.

The present invention uses a collection of distributed control zones for aircraft tracking and control. Although the control zones can operate and function independently, they can also cooperate to provide aircraft tracking and control over wide areas. Communications using channelized spread-spectrum digital communications technology between aircraft, as well as between the aircraft and the ground controller, allows for frequency reuse similar to cellular frequency reuse plans.

Related Art Approaches

Typical approaches use GPS-based receivers and additional information, such as Wide Area Augmentation System (WAAS) information and data to increase the reliability and accuracy of the GPS-based measurements. However, there are currently no backup systems for GPS-based systems, nor are there any verification or other systems that do not originate from GPS-based systems. The present invention calculates distances and computes geographical positions (geopositions) of aircraft without the use of GPS satellite equipment, through the use of time-of-arrival measurements between aircraft and ground control stations.

System Overview

Figure 1:
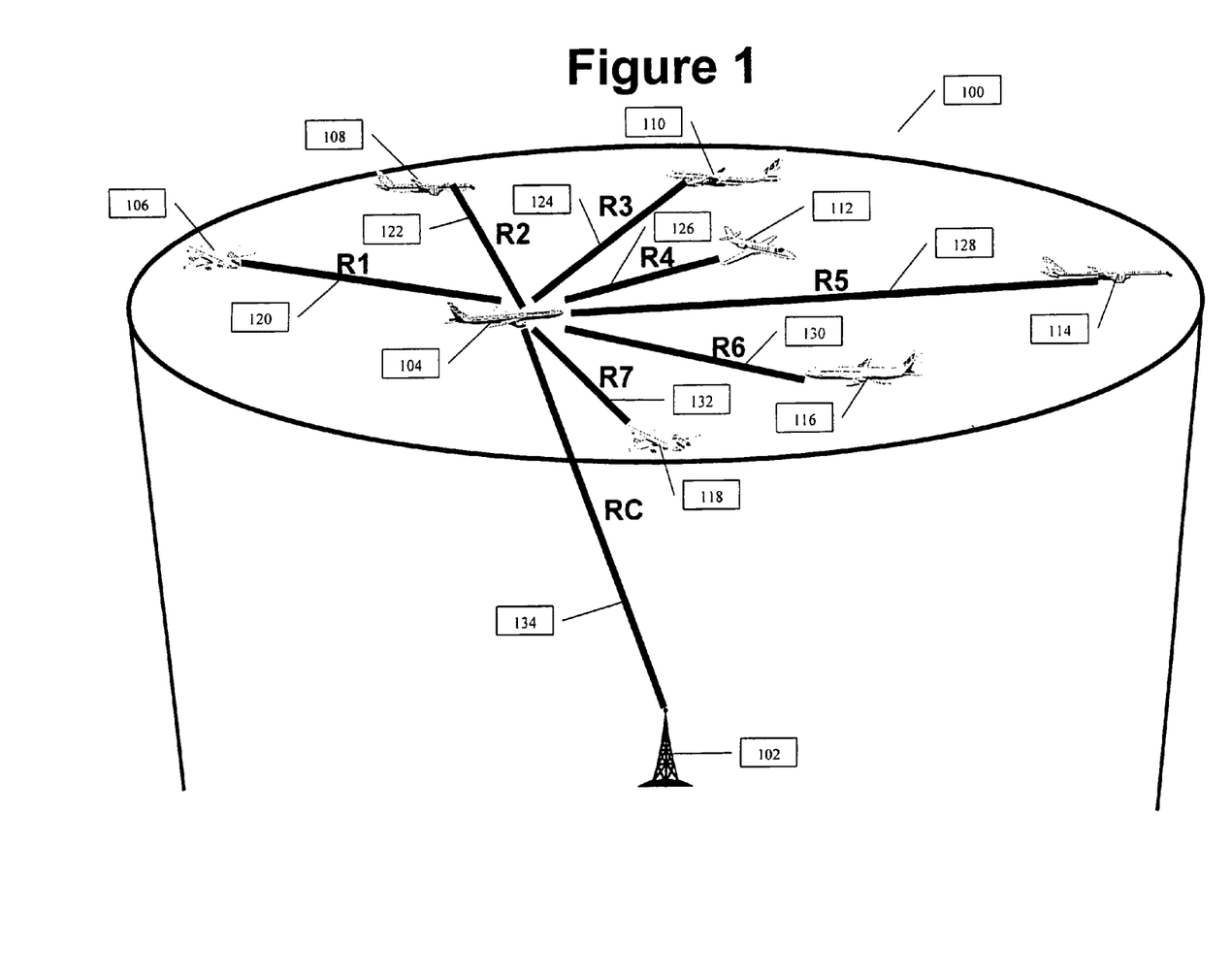
FIG. 1 illustrates a typical airspace and typical signals used within the present invention.

FIG. 1 illustrates a typical airspace and typical signals used within the present invention. Airspace 100 is typically controlled by ground controller 102. Aircraft 104 needs to be routed through airspace 100 and must determine the distance between aircraft 104 and aircraft 106–118. There may be a larger or smaller number of aircraft 106–118 within airspace 100; the number shown in FIG. 1 is merely for purposes of illustration and not limiting of the present invention.

Aircraft 104 must be able to determine the range between aircraft 104 and aircraft 106–118. The ranges 120–132 may or may not be critical to the flight path of aircraft 104. To assist with the determination of ranges 120–132, range 134, which is the distance between aircraft 104 and ground controller 102, is used to assist aircraft 104 in determining ranges 120–132.

By performing TOA measurements between each aircraft 106–118 on a periodic and continuous basis, as well as performing TOA measurements from ground controller 102, aircraft 104 can determine, without the use of GPS or any other external measurement system, the distance between aircraft 104 and each of the other aircraft 106–118, and determine whether or not any of the other aircraft 106–118 may be on a collision course with aircraft 104. Further, if there are enough aircraft 106–118 inside of airspace 100, aircraft 104 can determine, by using the known location of ground controller 102 and multilateration techniques, a very accurate absolute position coordinate of aircraft 104, as well as accurate absolute position coordinates of aircraft 106–118, without the use of GPS or other external systems.

Transmission and Reception Schema

Figure 2:
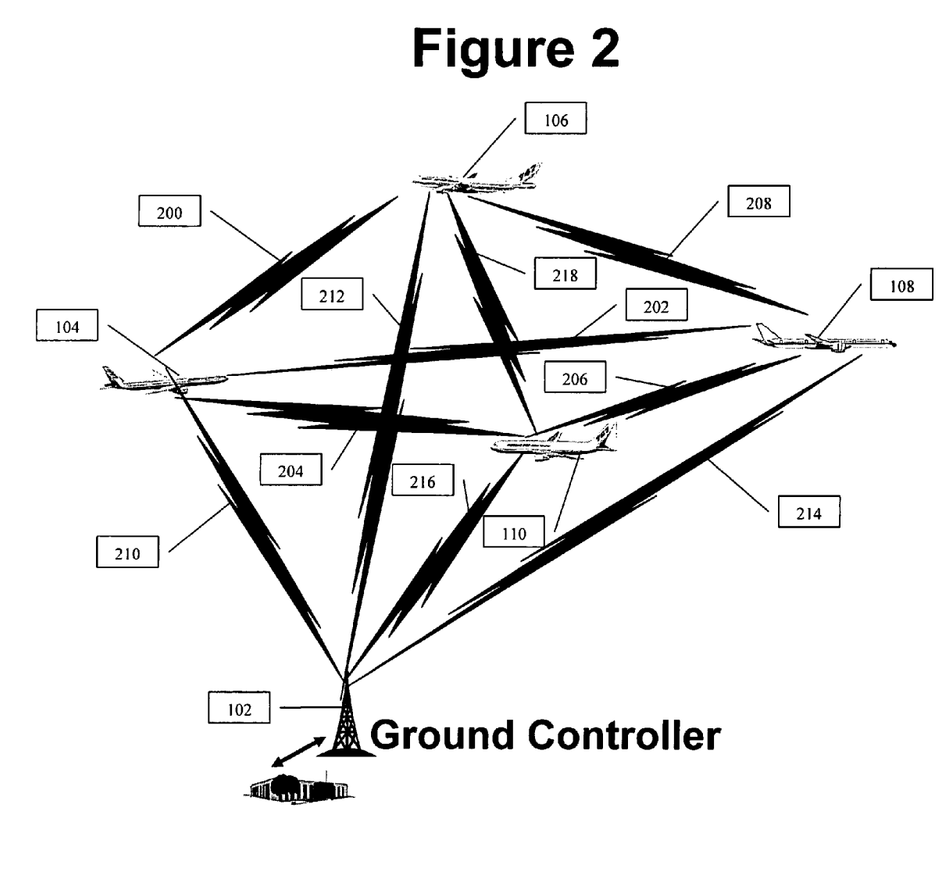
FIG. 2 illustrates the ground controller signals and typical transmissions in accordance with the present invention.

FIG. 2 illustrates the ground controller signals and typical transmissions in accordance with the present invention.

Aircraft 104 communicates bi-directionally with aircraft 106–110. Each aircraft 104–110 sends a message at periodic intervals that may comprise clock data, heading data, speed data, etc., to the other aircraft. So for example, and not by way of limitation, aircraft 104 sends a message that will be received by all other aircraft in a given airspace 100. Aircraft 106 receives message 200 on link 120. Aircraft 108 receives message 202 on link 122, etc. Each aircraft 104–110 in a given airspace 100 will be transmitting similar messages 200–208 on a periodic basis, so aircraft 104 receives data from other aircraft 106–110 within airspace 100 with the respective headings, speed, and time of transmission of the message sent by other aircraft 106–110.

Further, aircraft 104 is in communication with ground controller 102 via range measurement 134, and via bi-directional messages 210. This provides aircraft 104 with a constant measurement of distance to ground controller 102, as well as providing ground controller 102 with a constant measurement of distance to aircraft 104. Aircraft 106–110 also communicate with ground controller 102 via bi-directional messages 212–216, respectively.

Aircraft 104 then takes the received messages from aircraft 106, 108, 110 and ground controller 102 to determine the following data points:

distance to aircraft 106, distance to aircraft 108, distance to aircraft 110, and distance to ground controller 102.

Ground controller 102 and message 210 (as well as messages 212–216) can be used as a master clock for all aircraft 104–110 in airspace 100, or used as part of the determination of clock offsets for each aircraft 104–110 in airspace 100. Further, clock offsets between aircraft 104 and other aircraft 106–110 can be reduced or eliminated because of the bi-directional nature of the messages 200–204.

The time of arrival (TOA) of the message minus the time of transmission of the message sent by each of the aircraft gives the transit time of the message. Since distance=rate×time, and the rate of transmission of radio waves is the speed of light, distances or ranges can be determined by each aircraft 104–110 in a given airspace 100. Additional measurements in succeeding periods can determine whether a given aircraft 106–110 is approaching aircraft 104 (because the transit time of the succeeding messages will get shorter), the given aircraft 106–110 is moving away from aircraft 104 (because the transit time of the succeeding messages will get longer), or the given aircraft 106–110 is at a relatively constant distance from aircraft 104. Further, additional TOA measurements can be made to increase the accuracy of the final determined geodetic position. Even without rate or heading information in the messages being sent on links 120–124, transit time (time of arrival) measurements can determine whether or not aircraft 104 is on a possible collision course with any other aircraft 106–110 in airspace 100.

Further, the rate of change of the transit time for a given message 120–124 can alert aircraft 104 about the speed of each aircraft 106–110. A microprocessor or other computing device can use the range information and the rate of change information to determine parameters for safe operation of aircraft 104 as it traverses airspace 100.

Other information can be encoded into messages 200–208, as well as into messages 210–216. For example, and not by way of limitation, aircraft identifiers, such as airline and flight information (United Flight 1000, for example) can be encoded along with time of transmission information. As the information is decoded by each aircraft 104–110, the range and rate of change of the range can be associated with a given aircraft 104–110 by other aircraft 104–110 in airspace 100. So for example, and not by way of limitation, aircraft 104 and aircraft 110 would be able to determine not only that aircraft 104 and 110 are approaching each other, but the names of each aircraft 104 and 110 in airspace 100. If a microprocessor or other computing device determined that aircraft 104 and aircraft 110 were going to get within a mile of each other, then the pilots of aircraft 104 and 110 would be notified in the cockpit about the name of aircraft 104 and aircraft 110, or other information can be sent on link 204, such as the distance to ground controller 102 for each of the aircraft 104 and 110, heading information, altitude, or other information, to assist aircraft 104 and 110 in the determination of their flight paths and whether or not aircraft 104 and aircraft 110 are on a possible collision course. Further, pilots of each aircraft 104 and 110 can use voice communication to determine whether evasive action might be necessary.

Typical Operation

The ground controller 102 uses position reports and potential conflicts for safe separation distances between aircraft 104–110. The ground controller 102 also communicates vector and safe separation advisories to each aircraft within the airspace 100 for a given ground controller 102. For redundancy purposes, each ground controller 102 can also use a redundant send/receive technique, e.g., a repeated answer-back communcation schema, with each aircraft 104–110 within airspace 100.

Each ground controller 102 has an assigned channel for aircraft monitoring and control communications. In addition, each ground controller 102 can broadcast airspace 100—wide advisory and/or other information, such as weather conditions, to all aircraft 104–110 operating within airspace 100.

Each ground controller 102 also establishes independent TDMA or CDMA networks which are initiated and reconfigured as aircraft 104–110 traverse the airspace 100. The ground controller 102 establishes time or code assignments for each of the aircraft 104–110 and coordinates with adjacent ground controllers 102 for hand-offs of aircraft 104–110 that are entering and/or leaving airspace 100. Each aircraft 104–110 is assigned unique transmit and receive codes or time slots, such that each aircraft 104–110 receives transmissions from every other aircraft 104–110 in the airspace 100. Both aircraft 104–110 and the ground controller 102 measure all transmissions 200–216 for time-of-arrival (TOA). Two-way communications between each aircraft 104–110, as well as two-way communications between each aircraft 104–110 and ground controller 102, determine the position of each aircraft 104–110 and track the location of each aircraft 104–110.

Each aircraft 104–110 uses independent multiple TOA measurements (i.e., links 200–216) and multilateration to derive ranges and relative positions to other aircraft 104–110 in airspace 100, and may correlate the relative positions with radar returns or other methods. Each aircraft 104–110 uses the communications with the ground controller to derive a geodetic fixed position.

Determination of Aircraft Position

As shown in FIG. 2, and as an example, aircraft 104 communicates with ground controller 102 via link 210. Ground controller 102 is an accurately surveyed fixed reference point, with an accurately known longitude, latitude, and altitude, as well as a fixed clock reference. Unlike GPS, where each satellite has some error in the altitude and/or position because the GPS satellite orbit is not exactly known by GPS receivers, the known position of ground controller 102 provides additional information to aircraft 104 that a GPS-based system would not.

As aircraft 104 communicates back and forth with ground controller 102 via link 210, aircraft 104 has four unknown quantities: x, y, z, and time. Since ground controller 102 typically has a very accurate clock, time offsets between ground controller 102 and aircraft 104 can be eliminated via the two-way communication schema between ground controller 102 and aircraft 104, either by successive measurement and offset removal, or by synchronizing the aircraft 104 clock to the ground controller clock, or by other means. Thus, TOA measurements between aircraft 104 and ground controller 102 will result in a distance z between aircraft 104 and ground controller 102 that is accurately known. The x and y coordinates of aircraft 104, however, cannot be determined, and, as such, aircraft 104 and ground controller 102 only know that aircraft 104 is some distance, namely range RC 134, away from ground controller 102. In essence, this one measurement determines the radius of a sphere around ground controller 102, the surface on which aircraft 104 is currently residing.

If there are no other aircraft 106–110 in airspace 100, then there are no collision issues of concern.

If there is one other aircraft, say aircraft 106, in airspace 100, then there are additional links 200 and 212 that can be used to generate more accurate position and collision avoidance data for aircraft 104 and 106.

Again, as with aircraft 104, the position of aircraft 106 can be resolved between aircraft 106 and ground controller 102 to be a sphere, with a radius determined as the distance between aircraft 106 and ground controller 102. This is determined using link 212.

Link 200, which is range R1 120, now further resolves both the position of aircraft 104 and aircraft 106. Link 200 is a bi-directional message stream between aircraft 104 and aircraft 106, which allows each aircraft 104–106 to make TOA measurements. The clock offset between aircraft 104–106 can be eliminated by the two-way communications link, as well as synchronization issues which involve using the ground controller 102 clock as described above. Once range R1 120 is determined, additional information is now available to aircraft 104 and 106, because a triangle can be created by the ranges R1 120, RC 134, and the range from aircraft 106 to ground controller 102. The length of the sides of this triangle, which are determined by the ranges 120, 134, and the range from aircraft 106 to ground controller 102, adds another equation to both aircraft 104 and 106 to solve for one of the remaining variables. And so, the sphere determined previously now becomes a planar surface that intersects each sphere, which is a circle. The radius of the circle is calculated from the range R1 120.

The ground controller 102 and each aircraft 104–106 merely have to monitor range R1 120 to determine whether or not a possible collision event will occur. The rate of change of the range R1 120, as well as vector information from aircraft 104–106, may make monitoring easier, as well as more effective and accurate, or make monitoring on a continual basis more or less necessary. For example, and not by way of limitation, if range R1 120 is getting larger every monitoring period, then it may be prudent to focus ground controller 102 and aircraft 104–106 processing capabilities elsewhere, and monitor range R1 120 less frequently. On the other hand, if range R1 120 is getting smaller, then it may be necessary to monitor range R1 120 more frequently, or use other information such as heading, speed, and reported altitude of aircraft 104–106 to determine whether a collision event may occur. Many possibilities of levels of scrutiny of the range R1 120 are possible within the scope of the present invention.

As a third aircraft 108 enters airspace 100, similar measurements between aircraft 104, 106, and 108, and ground controller 102, are made as described herein above. Once the range R2 122 is determined as well as the range between ground controller 102 and aircraft 108, the geodetic positions (also known as geopositions) of each aircraft 104–108 can be determined with a fair degree of accuracy. In essence, each aircraft 104–108 determines a sphere with radius equal to the range of the given aircraft 104–108 to the ground controller 102. Each aircraft 104–108 also determines a range from itself to the other aircraft 104–108 in airspace 100. Once there are three aircraft, and the clock offsets are removed from the problem via the two-way cancellation, clock synchronization, or other methods, there are three equations that have been solved and three unknowns (x, y, and z), all with reference to a known point (the geodetic position of the ground controller 102). As such, each sphere determined must intersect at one and only one point for each aircraft 104–108, which point is the geoposition of each aircraft 104–108.

Additional aircraft 110–118 that enter airspace 100 typically add to the accuracy of the geoposition determination of each aircraft 104–118 in airspace 100. Additional aircraft 110–118, since they add to the accuracy of the geoposition determination of all aircraft 104–118 in the airspace 100, make it safer to operate aircraft 104–118 in airspace 100, as long as minimum separation requirements can still be met within airspace 100.

Transition Zones

Figure 3:
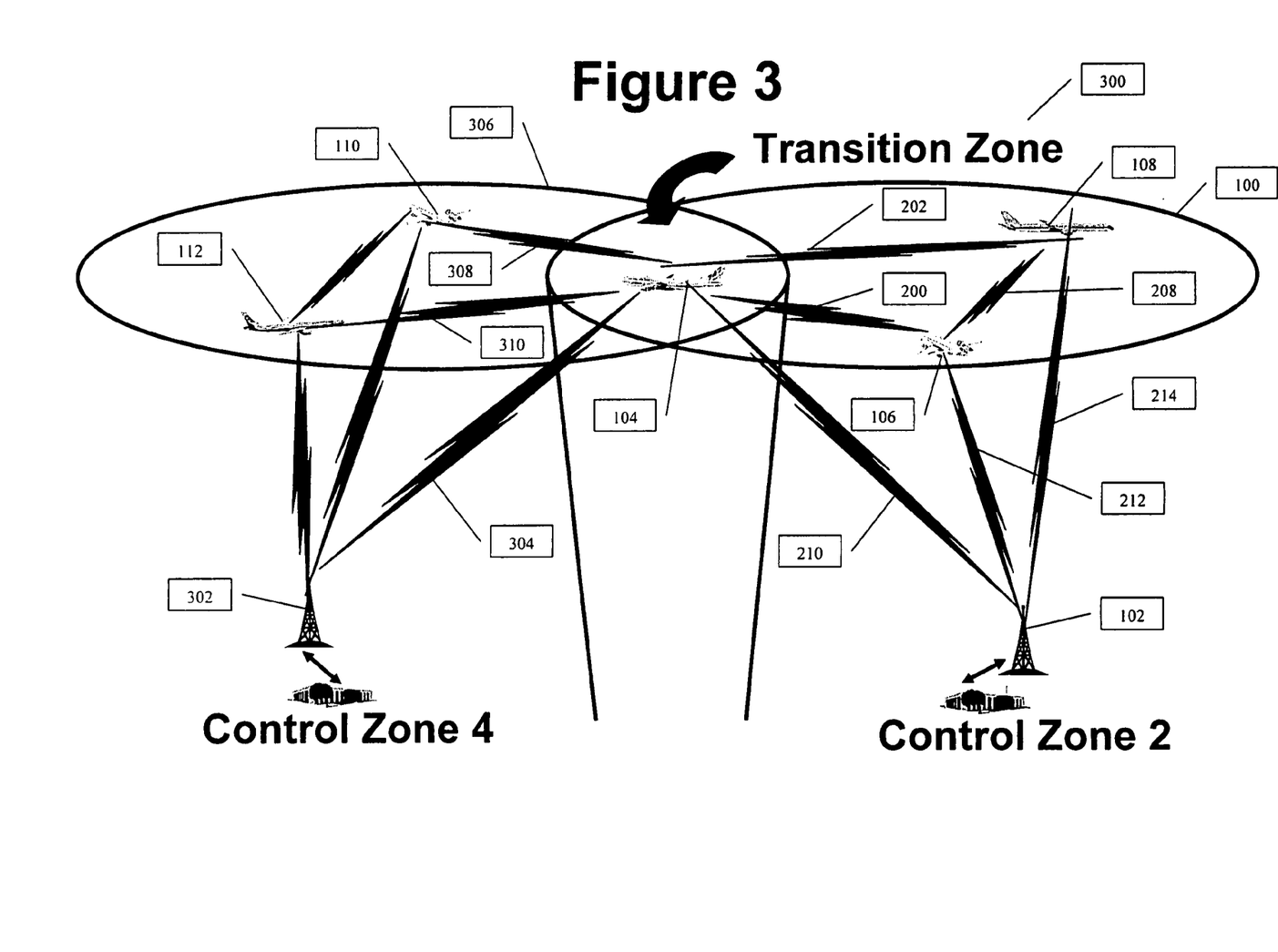
FIG. 3 illustrates the airspace and transition zones for a given ground controller within the present invention.

FIG. 3 illustrates the airspace and transition zones for a given ground controller within the present invention.

As aircraft 104 nears the edge of airspace 100, it will enter one or more transition zones 300 where aircraft 104, under control of ground controller 102, begins transition into a different airspace which is controlled by a different ground controller 302. While in transition zone 300, not only are links 200, 202, and 210 still active, an additional link 304 is established to inform ground controller 302 about aircraft 104's position and heading. The determination of when aircraft 104 and/or ground controller 302 begin communicating on link 304 can be made by any number of methods, including but not limited to, a signal from ground controller 102 that aircraft 104 has traversed airspace 100, a determination by aircraft 104 of aircraft 104's geoposition, or other methods.

Link 304 is used to begin communications for aircraft 104 as it enters airspace 306, where it must communicate with aircraft 110 and 112. If aircraft 104 already has determined its geoposition with assistance from ground controller 102 and/or aircraft 106 and 108, such position can be sent to ground controller 302 and/or aircraft 110 and 112 to assist aircraft 110 and 112 in determining their geopositions. Further, bi-directional TOA measurements made between aircraft 104 and aircraft 110 and 112 on links 308 and 310 respectively, along with any geopositional aiding that can be provided by aircraft 104, will assist ground controller 302 in monitoring the airspace 306 to prevent collisions and assist aircraft 104, 110, and 112 in collision avoidance procedures.

Extension of Airspace

Figure 4:
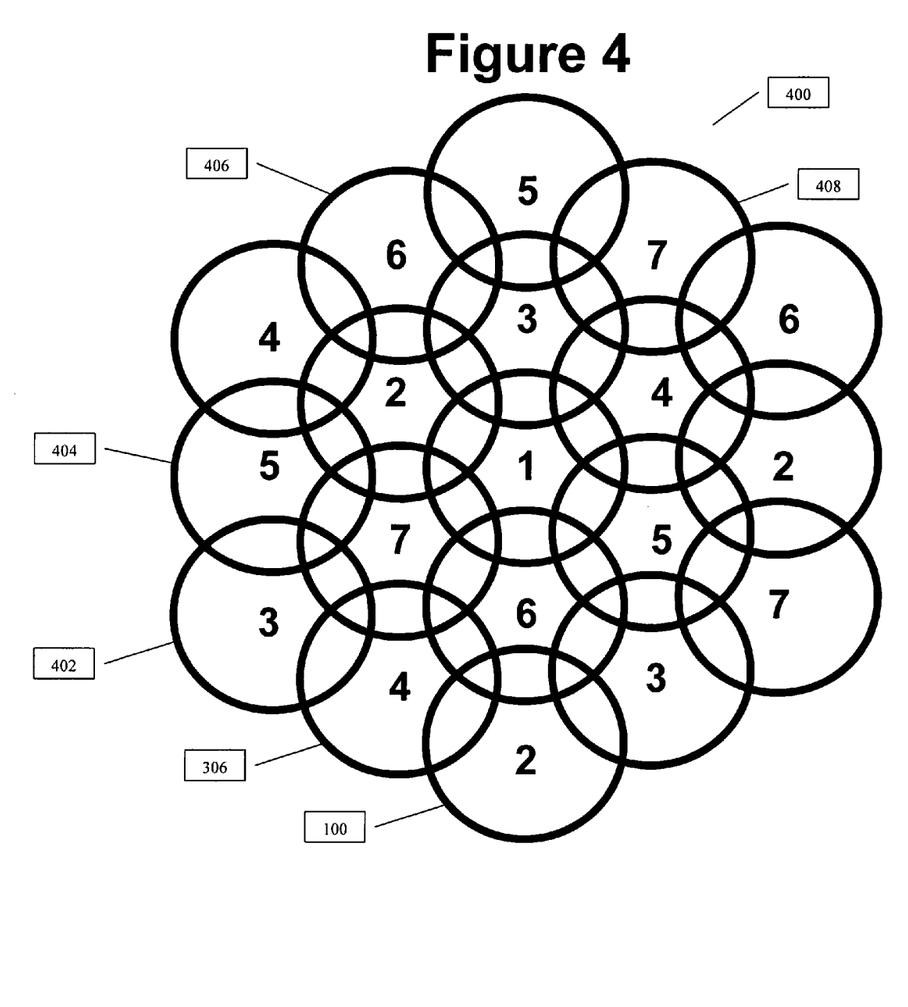
FIG. 4 illustrates a larger airspace where multiple ground controllers may be present in accordance with the present invention.

FIG. 4 illustrates a larger airspace where multiple ground controllers may be present in accordance with the present invention.

Larger airspace 400 is divided up into several airspaces that each use a different frequency to communicate with aircraft 104–118 within each given airspace. For example, and not by way of limitation, airspace 100 may use frequency 2 (as indicated by the numeral 2 in the center of airspace 100), while airspace 306 uses frequency 4, airspace 402 uses frequency 3, airspace 404 uses frequency 5, airspace 406 uses frequency 6, and airspace 408 uses frequency 7. The frequency reuse pattern shown in larger airspace 400 is merely for example, and other frequency reuse patterns can be used without departing from the scope of the present invention.

Such a frequency reuse pattern in larger airspace 400 allows a larger airspace 400 to control planes and "hand-off" aircraft 104–118 that are transitioning between airspaces, much like a cellular telephone system hands-off callers that move between one cell site's coverage area and another cell site. If desired, the frequency pattern may also assist aircraft 104–118 in determination of aircraft 104–118's position as a positioning aide.

Flowchart

Figure 5:
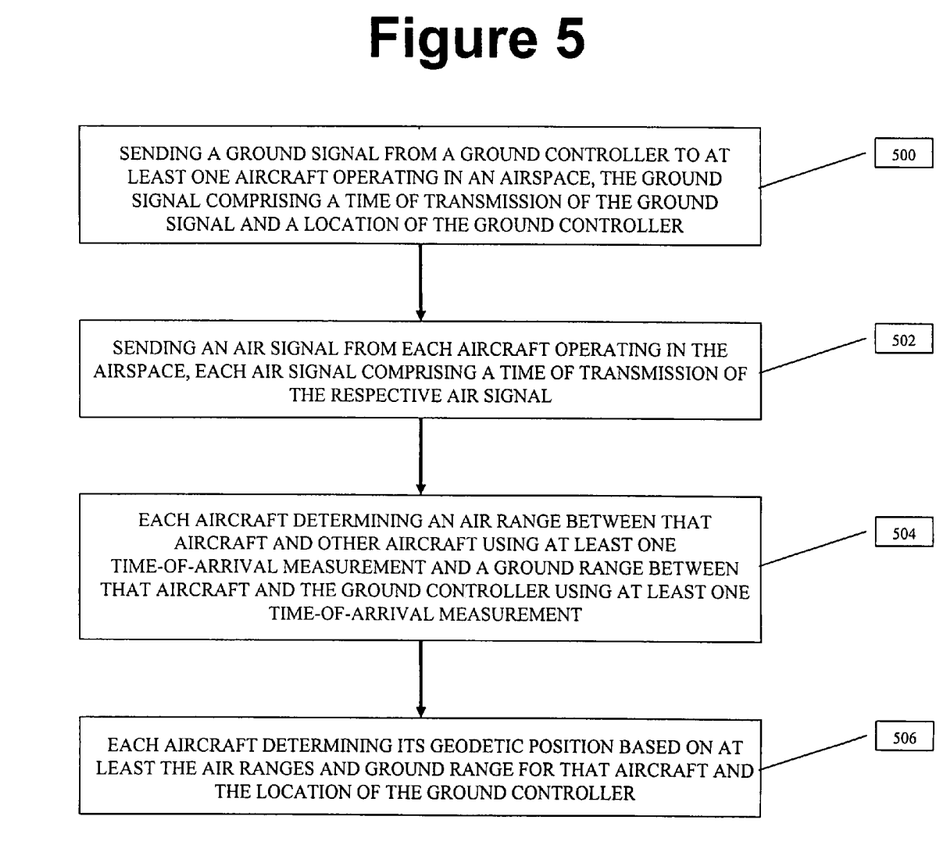
FIG. 5 is a flowchart illustrating the steps used in performing the present invention.

FIG. 5 is a flowchart illustrating the steps used in performing the present invention.

Box 500 illustrates sending a ground signal from a ground controller to at least one aircraft operating in an airspace—the ground signal comprising a time of transmission of the ground signal and a location of the ground controller.

Box 502 illustrates sending an air signal from each aircraft operating in the airspace—each air signal comprising a time of transmission of the respective air signal.

Box 504 illustrates each aircraft determining an air range between that aircraft and other aircraft using at least one time-of-arrival (TOA) measurement, and a ground range between that aircraft and the ground controller using at least one TOA measurement.

Box 506 illustrates each aircraft determining its geodetic position based on at least the air ranges and ground range for that aircraft and the position of the ground controller.

CONCLUSION

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

The present invention comprises a method and apparatus for determining and tracking the geodetic position of an aircraft. An apparatus in accordance with the present invention comprises a ground controller assigned to an airspace and at least one aircraft communicating with the ground controller on a bi-directional communications link, wherein each aircraft transmits an aircraft signal comprising at least a time of transmission of the aircraft signal; the ground controller transmits a ground signal comprising at least a time of transmission of the ground signal and a location of the ground controller; each aircraft performs time-of-arrival (TOA) measurements on the aircraft signals received by that aircraft and also performs TOA measurements on the ground signal received by that aircraft; the ground controller performs TOA measurements on each of the aircraft signals received by the ground controller; each aircraft determines an air range between that aircraft and other aircraft and a ground range between that aircraft and the ground controller; each aircraft determines its geodetic position based on at least the air ranges and ground range for that aircraft and the position of the ground controller; and the ground controller monitors each of the aircraft within the airspace to warn each of the aircraft about possible collisions between aircraft.

The system can also comprise at least one additional ground controller, each additional ground controller assigned to a separate airspace, and at least one transition zone, wherein the transition zone comprises the overlap of at least two of the airspaces. When the aircraft is in the transition zone, the aircraft sends and receives signals from more than one ground controller; and the ground controllers that are each receiving signals from the aircraft in the transition zone can send additional signals between the ground controllers. The ground controllers can each transmit on a different frequency and can each assign transmission slots to each aircraft operating in that ground controller's respective airspace in a Time Domain Multiple Access (TDMA) communications system.

The aircraft signals may further comprise identification data for identifying the transmitting aircraft, and each aircraft can also transmit, as part of its aircraft signals, air range calculations performed by that aircraft.

A method in accordance with the present invention comprises sending a ground signal from a ground controller to at least one aircraft operating in an airspace, the ground signal comprising a time of transmission of the ground signal and a location of the ground controller; sending an air signal from each aircraft operating in the airspace, each air signal comprising a time of transmission of the respective air signal, wherein each aircraft determining an air range between that aircraft and other aircraft, and a ground range between that aircraft and the ground controller, and each aircraft determining its geodetic position based on at least the air ranges and ground range for that aircraft and the position of the ground controller.

The method may also include sending a second ground signal from a second ground controller to aircraft operating in a transition zone between the ground controller and the second ground controller, or sending additional signals between the ground controllers and the second ground controller. Further, the ground controllers can transmit on different frequencies or operate in a TDMA system. The aircraft signals can also comprise identification data for identifying the transmitting aircraft, and each aircraft can transmit, as part of its aircraft signals, air range calculations performed by that aircraft.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended and the equivalents thereto.

What is claimed is:

1. A mobile platform tracking and collision avoidance system, comprising:
   a ground controller assigned to a geographic space; and
   at least one mobile platform communicating with the ground controller on a bi-directional communications link, wherein
   each mobile platform transmits a mobile platform signal comprising at least a time of transmission of the mobile platform signal;
   the ground controller transmits a ground signal comprising at least a time of transmission of the ground signal and a location of the ground controller;
   each mobile platform performs time-of-arrival (TOA) measurements on the mobile platform signals received by that mobile platform and also performs TOA measurements on the ground signal received by that mobile platform;
   the ground controller performs TOA measurements on each of the mobile platform signals received by the ground controller;
   each mobile platform determines an air range between a first mobile platform and another mobile platform and a ground range between the first mobile platform and the ground controller;
   each mobile platform determines a geodetic position based on at least the air ranges and ground range for the first mobile platform and the position of the ground controller; and
   the ground controller monitors each of the mobile platforms within the geographic space to warn each of the mobile platforms about possible collisions between mobile platforms.

2. The mobile platform tracking and collision avoidance system of claim 1, further comprising at least one additional ground controller, each additional ground controller assigned to a separate geographic space.

3. The mobile platform tracking and collision avoidance system of claim 2, further comprising at least one transition zone, wherein the transition zone comprises the overlap of at least two of the geographic spaces.

4. The mobile platform tracking and collision avoidance system of claim 3, wherein when the mobile platform is in the transition zone, the mobile platform sends and receives signals from more than one ground controller.

5. The mobile platform tracking and collision avoidance system of claim 4, wherein the more than one ground controller sends additional signals between the more than one ground controllers.

6. The mobile platform tracking and collision avoidance system of claim 5, wherein each ground controller transmits on a different frequency.

7. The mobile platform tracking and collision avoidance system of claim 6, wherein each ground controller assigns transmission slots to each mobile platform operating in that ground controller's respective geographic space in a Time Domain Multiple Access (TDMA) communications system.

8. The mobile platform tracking and collision avoidance system of claim 1, wherein the mobile platform signals further comprise identification data for identifying the transmitting mobile platform.

9. The mobile platform tracking and collision avoidance system of claim 1, wherein each mobile platform transmits, as part of each mobile platform's signals, air range calculations performed by each respective mobile platform.

10. A method for determining geodetic position of a mobile platform, comprising:
    sending a first ground signal from a first ground controller to at least one mobile platform operating in a geographic space, the ground signal comprising a time of transmission of the first ground signal and a location of the first ground controller;
    sending an air signal from each mobile platform operating in the geographic space, each air signal comprising a time of transmission of the respective signal; wherein
    each mobile platform determining an air range between a first mobile platform and another mobile platform using at least one Time-Of-Arrival (TOA) measurement, and a ground range between the first mobile platform and the first ground controller using at least one TOA measurement; and
    each mobile platform determining a geodetic position based on at least the air ranges and ground range for the first mobile platform and the position of the first ground controller.

11. The method of claim 10, further comprising sending a second ground signal from a second ground controller to mobile platforms operating in a transition zone between the ground controller and the second another ground controller.

12. The method of claim 11, further comprising sending additional signals between the ground controllers and the second ground controller.

13. The method of claim 12, wherein the ground controller transmits on a first frequency and the second ground controller transmits on a second frequency.

14. The method of claim 13, wherein each ground controller assigns transmission slots to each mobile platform operating in that ground controller's respective geographic space in a Time Domain Multiple Access (TDMA) communications system.

15. The method of claim 10, wherein the mobile platform signals further comprise identification data for identifying the transmitting mobile platform.

16. The method of claim 10, wherein each mobile platform transmits, as part of each mobile platform signals, at least one air range calculation performed by each respective mobile platform.

* * * * *